United States Patent [19]

Kienel

[11] 4,161,547
[45] Jul. 17, 1979

[54] METHOD OF PRODUCING ANTIREFLECTIVE COATINGS ON POLYDIETHYLENEGLYCOLDIALLYLCARBONATE, AN OPTICAL PRODUCT MADE BY THE METHOD, AND THE USE OF THE OPTICAL PRODUCT

[75] Inventor: Gerhard Kienel, Hanau, Fed. Rep. of Germany

[73] Assignee: Leybold-Heraeus GmbH & Co. KG, Cölogne, Fed. Rep. of Germany

[21] Appl. No.: 862,874

[22] Filed: Dec. 21, 1977

[30] Foreign Application Priority Data

Dec. 23, 1976 [DE] Fed. Rep. of Germany ....... 2658417

[51] Int. Cl.² .............................................. G02B 5/28
[52] U.S. Cl. .................................. 428/213; 350/164;
    350/175 NG; 351/166; 427/164; 427/248 J;
    428/412; 428/432
[58] Field of Search ............... 427/164, 165, 166, 167,
    427/248 A, 248 B, 248 C, 248 E, 248 J, 296;
    350/164, 165, 166, 175 NG; 351/166; 428/213,
    214, 333, 412, 432

[56] References Cited

U.S. PATENT DOCUMENTS

| | | | |
|---|---|---|---|
| 3,934,961 | 1/1976 | Itoh et al. | 427/166 |
| 3,953,652 | 4/1976 | Addiss, Jr. | 428/412 |
| 3,984,581 | 10/1976 | Dobler et al. | 427/164 |
| 3,991,234 | 11/1976 | Chang et al. | 427/248 J |
| 4,079,160 | 3/1978 | Philipson | 428/412 |

*Primary Examiner*—William J. Van Balen
*Attorney, Agent, or Firm*—Sprung, Felfe, Horn, Lynch & Kramer

[57] ABSTRACT

An optical body and a method of producing oxidic, antireflective coatings on transparent plastic substrates of polydiethyleneglycoldiallylcarbonate comprising depositing a first coating having a high refractive index by vaporizing an oxide mixture of essentially zirconium dioxide with a content of 4 to 15 weight percent of aluminum trioxide and depositing a second layer having a low refractive index by vaporizing in a vacuum a borosilicate glass containing less than 5 weight-percent of alkali metal oxides. The depositing of at least the first coating is performed in an oxidizing residual gas atmosphere.

6 Claims, 2 Drawing Figures

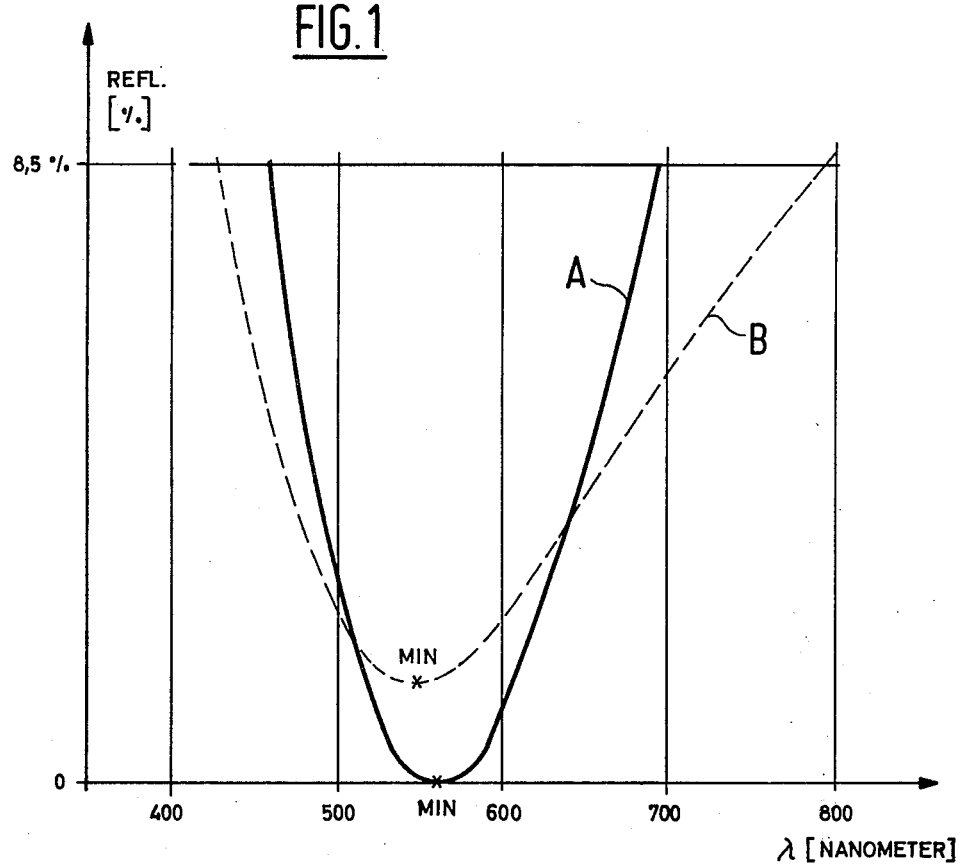
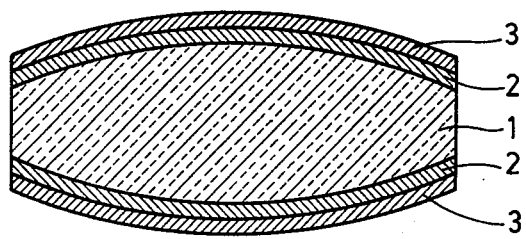

METHOD OF PRODUCING ANTIREFLECTIVE COATINGS ON POLYDIETHYLENEGLYCOLDIALLYLCARBONATE, AN OPTICAL PRODUCT MADE BY THE METHOD, AND THE USE OF THE OPTICAL PRODUCT

BACKGROUND OF THE INVENTION

The invention relates to a method of producing oxidic, antireflective coatings on transparent plastic substrates, especially on sheets and lenses of polydiethyleneglycoldiallylcarbonate, in which the substrate is vacuum coated with an initial layer of high index of refraction and then with a second layer of lower index of refraction.

The demand for stable antireflective coatings on transparent substrates has long existed. The fact that they improve transmission by about 8 to 10% is of secondary importance. What is more important is the elimination of light reflection, which is especially desirable when the substrate in question is situated between an observer or viewer and an object. This is particularly the case, for example, with aircraft and motor vehicle windshields and with eyeglass lenses. Especially in the dark, light rays which strike the substrate from in back of the viewer produce reflections which are several times brighter than the observed object and virtually blind the observer. Sunlight striking the glazing of a helicopter cockpit from the rear, or light from the headlights of an automobile reflected from the windshield of a car in front of it, are examples of this situation. But even light coming from the direction of the object can produce undesirable reflections when, after passing through the substrate, it is reflected from behind it, for example by light-colored clothing or by the cornea of the human eye. The latter circumstance is a particular nuisance in the case of eyeglass lenses.

While the antireflective coating of inorganic substrates has been accomplished in a substantially satisfactory manner, the situation is still very poor in regard to plastic substrates. The reason for this is to be found in the fact that, on the basis of physical laws, the index of refraction of the antireflective coating must be lower than the index of refraction of the substrate. Consequently, a large number of oxidic materials are unusable for the production of antireflective coatings. As for the rest of them, some are difficult to vaporize, and with others the substrate has to be heated to temperatures between 300° and 350° C., either during the vacuum coating or in an after-treatment, in order to achieve the desired coating properties. Such substrate temperatures, however, are impractical for obvious reasons. It is not possible, for example, to use on plastic substrates the magnesium fluoride which can be used on inorganic substrates. Microfissures form in the coating; the coating comes off even in the sweat test. In addition, a single-layer coating does not produce sufficient antireflective effect. The reasons for this are familiar to the average technically trained person. The efforts are therefore all directed towards multiple layers or laminated systems.

In the book, "Die Fachvorträge des WVAO-Jahreskongresses 1973 in Berlin," published by the Wissenschaftliche Vereinigung für Augenoptik und Optometrie e.V., of Bad Godesberg, it is recommended in connection with the antireflective coating of plastic glasses and in consideration of the above-mentioned physical laws regarding the refractive indices, that first the plastic substrate be coated with a layer of higher refractive index of about n=2, and then with a silicate layer. The following are given as requirements of the coating:

(a) Low reflection at the maximum sensitivity of the eye for light,
(b) Freedom from absorption,
(c) Strength of adhesion,
(d) Hardness
(e) Resistance to chemicals, sweat and mold,
(f) Resistance to wiping (scratch resistance),
(g) Temperature stability,
(h) Low aging effect.

It has been found that, with the plastic glass coatings thus specified, a temperature stability up to about 90° to 100° C. is obtained, but only in the dry state, not, for example, in the sweat test.

For example, the attempt has been made to improve the teaching given in the above citation by applying, as the first, highly refractive layer, one of titanium dioxide, and, as the second, less refractive layer, one of magnesium fluoride. It has been found, however, that the second layer is easily removed during the sweat test and upon heating, while the first layer usually remains undamaged. The latter by itself, however, does not fulfill the purpose of a high reduction of reflection. With regard to the index of refraction, cryolite might serve for the second layer, but its hygroscopicity precludes its use.

It has furthermore been found that plastics show an extraordinarily different behavior under vacuum coating conditions. This is the case, for example, with regard to surface properties before and after any glow discharge treatment that may be necessary, and with regard to the removal of monomers by evaporation, and consequently also with regard to strength of adhesion. Aging during the later use of the vacuum coated objects differs completely from one plastic to another. Finally, there are great differences in the index of refraction, which is what determines the optical properties in conjunction with thin coatings, and the thermal expansion coefficient and modulus of elasticity, which are important to mechanical strength. For each plastic and for each group of plastics, it is therefore necessary to develop a tailored-to-measure vacuum coating procedure, especially when, for other reasons, the plastic must comply with other special requirements which have no connection with the coating, such as resistance to shattering, for example.

SUMMARY OF THE INVENTION

The invention, therefore, is addressed to the problem of devising a method of producing antireflective coatings on polydiethyleneglycoldiallylcarbonate, which results in the production of coatings which largely fulfill the requirements given above, in every respect. Polydiethyleneglycoldiallylcarbonate, also known as "CR-39," has proven to be especially good for eyeglass lenses for optical reasons and on account of its hardness.

The solution of the stated problem is accomplished in the specified plastic by depositing the first layer by vaporizing an oxide mixture of essentially $ZrO_2$ with a content of 4 to 15 weight-percent of $Al_2O_3$, and the second layer by vaporizing a borosilicate glass containing less than 5 weight-percent of alkali metal oxides, the application of at least the first layer being performed in an oxidizing residual gas atmosphere.

The statement that the oxide mixture consists essentially of $ZrO_2$ means that the oxide mixture consists predominantly of $ZrO_2$. The presence of other oxides is not excluded, however all that is necessary is a content of 4 to 15% of $Al_2O_3$ by weight. An especially suitable borosilicate glass is sold, for example, by Schott und Genossen in Mainz under Glass Number 8329. Another suitable borosilicate glass is described in German Pat. No. 1,934,217. This is a glass which is easily vaporizable in a vacuum by means of electron beams, and in which the alkali metal oxide content is kept to less than 4 weight-percent so as to avoid sputtering when it is vaporized. The simultaneously required low content of aluminum oxide is especially favorable to vaporization by electron beams.

Vacuum coating in an oxidizing residual gas atmosphere, which can be produced, for example, by evacuating to a suitable level and then admitting pure oxygen to produce the desired vacuum, counteracts the tendency of zirconium oxide to decompose.

It has surprisingly been found that, if the stated parameters are maintained, an antireflective double layer system is formed, which has excellent stability in all tests, and can be repeatably applied with a good degree of uniformity as regards the layer thickness distribution, even on substantially larger substrate surfaces than eyeglass lenses, for example. Such coatings have proven to have an excellent stability in the sweat test of DIN 50017. In these tests the substrates are subjected for 8 hours to a temperature of 40° C. and an atmospheric humidity of about 100%, and then to normal atmospheric conditions for 16 hours. This cycle is repeated several times. The coatings proved to be outstandingly stable even in the salt fog test of DIN 50021. In this test the substrates are in a chamber in which, at a temperature of 35° C., a fog of water containing 5 weight-percent of sodium chloride is produced. The coatings withstand the "Tesafilm" test in which the attempt is made to pull the coating off perpendicularly to the substrate surface by means of a self-adhesive tape. With regard to the optical qualities of the coating, it is to be stated that the first layer is virtually absorption-free, even though it has been applied to an unheated substrate. With regard to the antireflection bandwith it was found that the antireflection curve becomes broader in the visible light range than it is in a coating of pure $ZrO_2$. In this manner the intensity of the residual reflection is decreased. With regard to the vaporization characteristics, the oxide mixture can be vaporized more easily and at a more constant rate than pure $ZrO_2$. The products produced in this manner withstand even a thermal shock test which is not ordinarily performed: they were dropped into boiling water at room temperature and left in it for one hour. After they were removed, little or no damage could be seen in the coating.

The two individual coatings are generally deposited in a thickness of a quarter wavelength each with respect to the wavelength of visible light for which the human eye has the maximum sensitivity. By means of two quarter wavelength layers it is possible by the method of the invention to achieve a residual reflection of close to 0% for a particular wavelength. It is possible to shift the reflection minimum to other wavelengths, thereby influencing the color characteristic. If the first layer is reduced in thickness, e.g., to a thickness of about a twelfth of a wavelength, and the application of the second coat of borosilicate glass is continued until the reflection reaches a minimum, the reflection minimum will be at a higher level, but the antireflection range will be wider.

The subject of the invention has proven to be well suited for use on eyeglasses if the lenses are vacuum coated on both sides.

BRIEF DESCRIPTION OF THE DRAWINGS

FIG. 1 is a graph of the antireflection characteristic of the present invention; and FIG. 2 is a cross-sectional view of the coated substrate.

DETAILED DESCRIPTION OF THE INVENTION

Referring now to FIGS. 1 and 2, the optical body of the invention includes an eyeglass lens of polydiethyleneglycoldiallylcarbonate, the higher refractive index coating 2 of $ZrO_2$ thereon and the lower refractive index coating 3 of borosilicate glass disposed on coating 2. The layers 2 and 3 are on both sides of lens 1 in sequence.

FIG. 1 illustrates the antireflection curve of the optical body shown in FIG. 2, with the specifics set forth in the following Examples.

EXAMPLES

EXAMPLE 1

In a vertical apparatus having a cell diameter of 700 mm, 40 eyeglass lenses of a diameter of 60 mm made from polydiethyleneglycoldiallylcarbonate (CR 39) were suspended from a dome-shaped substrate holder. The apparatus was evacuated down to a pressure of $2 \times 10^{-5}$ Torr, and then air was let in through a needle valve until the pressure had increased to $10^{-1}$ Torr. For purification, a glow discharge of 2 minutes' duration was performed using a sector cathode with simultaneous relative movement between the sector cathode and the lenses. The glow discharge power was 0.2 watts per square centimeter of cathode surface. At the end of the glow discharge the vacuum was again reduced to $2 \times 10^{-5}$ Torr and pure oxygen was admitted to increase the pressure to $1 \times 10^{-4}$ Torr. A mixture of 94 wt-% of $ZrO_2$ and 6 wt.-% of $Al_2O_3$ was vaporized from one bowl of the water-cooled crucible of an electron beam vaporizer, until the thickness of the coating was one quarter wavelength at a photometer wavelength of 550 nanometers. The vaporizing rate was adjusted so that the coating time extended over a period of 4 minutes. Then the feeding of oxygen was interrupted and from another crucible bowl of the same vaporizer, granulated borosilicate glass No. 8329 of Schott und Genossen of Mainz was vaporized until this second layer had a thickness of a quarter wavelength at a photometer wavelength of 550 nanometers. The achievement of this thickness was detected by means of a conventional photometer using monochromatic light. When this thickness is reached, the reflectivity of the coating is at a minimum value.

The treated eyeglass lenses were then subjected to the above-described sweat test of DIN 50017 and to the salt fog test of DIN 50021. No damage visible to the naked eye was done to the coating. The Tesafilm or Scotch Tape test produced no removal of the coating. Furthermore, the above-described thermal shock test with boiling water was performed, and no coating damage perceptible to the naked eye was produced. The measurement of the optical characteristics was performed with a Model DK2A measuring apparatus system of Beckmann Instruments over a wavelength range between 400 and 800 nanometers. The reduction of the reflectivity is represented by curve A in FIG. 1, in which it can be seen that the curve virtually reaches the zero line at about 550 nanometers. The 8.5% line represents in somewhat idealized form the reflectivity of the uncoated substrate. The coating structure itself was produced in the sequence shown in FIG. 2, wherein 1 represents an eyeglass lens of polydiethyleneglycoldiallylcarbonate, 2 the first layer of $ZrO_2$, containing 6% $Al_2O_3$, and 3 represents the second or cover coating of borosilicate glass of the composition given above. The layers and the sequence of the layers are the same on both sides of the lens.

EXAMPLE 2

The experiment of Example 1 was repeated, except that the first layer was deposited to a thickness of only one twelfth of a wavelength, and that the process of depositing the second layer was continued until the reflectivity of the system reached a minimum value. The mechanical and chemical properties of the coating did not differ measurably from the results obtained in Example 1. The optical properties are represented by Curve B in FIG. 1. The reflection minimum is also at about 550 nanometers, but does not reach the zero line, yet the curve on either side of the minimum is flatter than curve A, i.e., the antireflection range is broader.

What is claimed is:

1. A method of producing a three layer antireflective transparent article, comprising: providing a transparent plastic substrate of polydiethyleneglycoldiallylcarbonate to define the first layer; depositing a first coating on the substrate having a high refractive index by vaporizing an oxide mixture of substantially $ZrO_2$ with a content of 4 to 15 weight-percent of $Al_2O_3$ to define the second layer; and depositing a second coating on the first coating having a low refractive index by the vaporization in a vacuum of a borosilicate glass containing less than 5 weight-percent of alkali metal oxides, to define the third layer wherein the depositing of at least the first coating is performed in an oxidizing residual gas atmosphere.

2. The method according to claim 1, wherein the first and second coats are deposited in a thickness of a quarter wavelength with respect to the wavelength of visible light for which the human eye has the maximum sensitivity.

3. The method according to claim 1, wherein the first coat is applied in a thickness of about one twelfth of a wavelength with respect to the wavelength of visible light for which the human eye has the maximum sensitivity, and that the material of the second coat is deposited until the reflection has a minimum value.

4. A three layer antireflective transparent optical body, consisting of a substrate of polydiethyleneglycoldiallylcarbonate to define the first layer; a first coat on the substrate of $ZrO_2$ having a content of 4 to 15 weight-percent of $Al_2O_3$ and having a first refractive index to define the second layer; and a second coat of a borosilicate glass superposed on the first coating and containing less than 5 weight-percent of alkali metal oxides and having a second refractive index less than said first refractive index to define the third layer.

5. The optical body according to claim 4, wherein the first coating is applied by vaporizing the oxide mixture and the second coating is applied by vaporization in a vacuum and wherein at least the first coating is applied in an oxidizing residual gas atmosphere.

6. An optical lens comprising the optical body of claim 4.

* * * * *